(12) United States Patent
Eckholz

(10) Patent No.: US 12,528,121 B2
(45) Date of Patent: Jan. 20, 2026

(54) HOUSING FOR A VALVE OR A FITTING, SEMI-FINISHED PRODUCT FOR SUCH A HOUSING AND METHOD FOR ADDITIVELY MANUFACTURING SUCH A HOUSING

(71) Applicant: Samson Aktiengesellschaft, Frankfurt am Main (DE)

(72) Inventor: Holger Eckholz, Brechen (DE)

(73) Assignee: Samson Aktiengesellschaft, Frankfurt am Main (DE)

( * ) Notice: Subject to any disclaimer, the term of this patent is extended or adjusted under 35 U.S.C. 154(b) by 122 days.

(21) Appl. No.: 18/551,030

(22) PCT Filed: Mar. 9, 2022

(86) PCT No.: PCT/EP2022/056016
§ 371 (c)(1),
(2) Date: Sep. 18, 2023

(87) PCT Pub. No.: WO2022/194635
PCT Pub. Date: Sep. 22, 2022

(65) Prior Publication Data
US 2024/0165701 A1    May 23, 2024

(30) Foreign Application Priority Data
Mar. 18, 2021   (DE) .......................... 102021106730.8

(51) Int. Cl.
*B22F 5/10*         (2006.01)
*B22F 10/38*        (2021.01)
(Continued)

(52) U.S. Cl.
CPC .............. *B22F 5/10* (2013.01); *B22F 10/385* (2021.01); *B33Y 80/00* (2014.12); *F16K 27/02* (2013.01)

(58) Field of Classification Search
CPC ........ B23P 19/067; B23P 19/06; B23Q 15/14; B23Q 2717/00; F03D 13/10; F03D 13/20;
(Continued)

(56) References Cited

U.S. PATENT DOCUMENTS 6,915,813 B2 *   7/2005  Kobes ................... F16K 15/026
                                                    137/220
9,844,890 B2 *  12/2017  Hashish ................. B24C 1/045
(Continued)

FOREIGN PATENT DOCUMENTS

EP            3587876 A1     1/2020

OTHER PUBLICATIONS

Jun. 27, 2022 (PCT) International Search Report and Written Opinion—App. PCT/EP2022/056016.

*Primary Examiner* — Lawrence Averick
(74) *Attorney, Agent, or Firm* — Banner & Witcoff, Ltd.

(57) ABSTRACT

In a semi-finished product for a valve housing, such as a control valve housing or a fitting housing, may include an additively manufactured body having a built-up direction in which the body is formed in layers. The body may include an inlet channel, an outlet channel, a bridge section, and a neck portion for the valve or the fitting delimiting a channel structure to be formed for process fluid. The body forms an inner surface to be directed towards a process fluid and an outer surface to be facing the surroundings. The inner or outer surface may have at least one overhang surface with respect to the built-up direction, the overhang angle of which does not exceed an angular threshold value of at most 75°.

15 Claims, 6 Drawing Sheets

Figure 1:
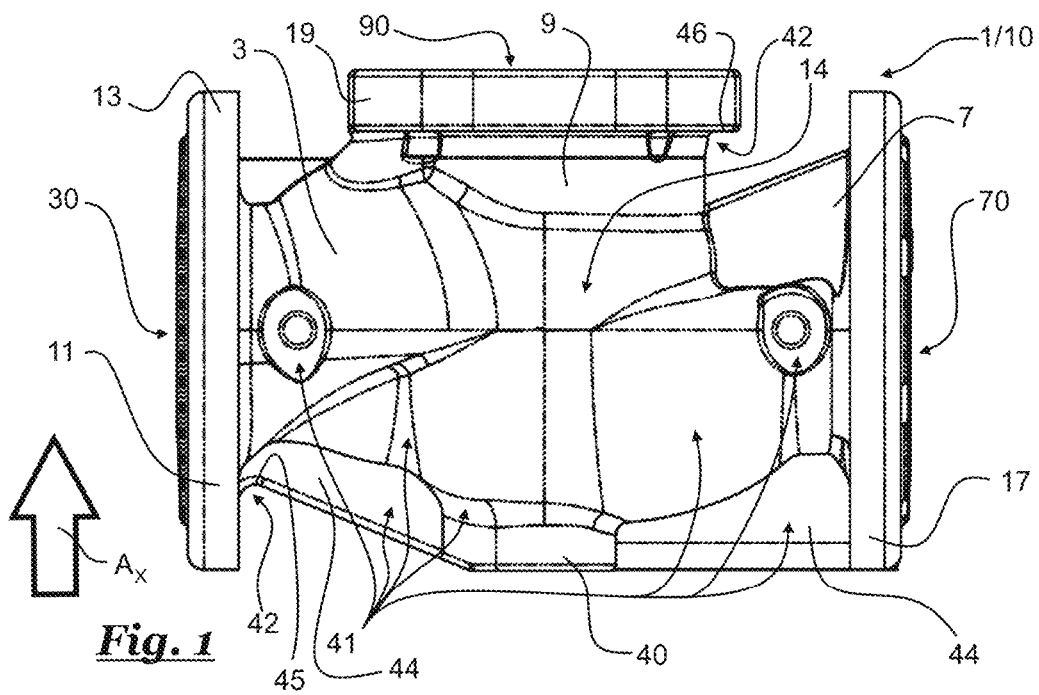

(51) Int. Cl.
*B33Y 80/00* (2015.01)
*F16K 27/02* (2006.01)

(58) Field of Classification Search
CPC ........... F05B 2230/60; F05B 2260/301; Y02E 10/72; Y02P 70/50; B25B 29/02
See application file for complete search history.

(56) References Cited

U.S. PATENT DOCUMENTS

| | | | |
|---|---|---|---|
| 10,557,732 B2 * | 2/2020 | Gottlieb | G01F 1/662 |
| 10,612,569 B2 * | 4/2020 | Dunham | F15B 15/12 |
| 10,712,754 B2 * | 7/2020 | Quaglia | B64D 15/02 |
| 10,787,846 B2 * | 9/2020 | Notarnicola | E05D 3/02 |
| 10,852,173 B2 * | 12/2020 | Gottlieb | B22F 10/28 |
| 11,162,592 B2 * | 11/2021 | Mezzino | F16K 3/265 |
| 11,307,070 B2 * | 4/2022 | Gottlieb | G01F 1/662 |
| 2004/0182438 A1 * | 9/2004 | Kobes | F16K 3/265 |
| | | | 137/220 |
| 2016/0214231 A1 * | 7/2016 | Hashish | B24C 1/045 |
| 2017/0220055 A1 * | 8/2017 | Quaglia | F16K 27/00 |
| 2019/0085874 A1 * | 3/2019 | Dunham | F15B 7/06 |
| 2019/0178691 A1 * | 6/2019 | Gottlieb | B22F 5/10 |
| 2019/0390779 A1 * | 12/2019 | Mezzino | F16K 3/265 |
| 2020/0191633 A1 * | 6/2020 | Gottlieb | G01F 1/115 |
| 2020/0361035 A1 * | 11/2020 | Käss | B22F 10/50 |
| 2022/0057246 A1 * | 2/2022 | Gottlieb | G01F 1/115 |

* cited by examiner

HOUSING FOR A VALVE OR A FITTING, SEMI-FINISHED PRODUCT FOR SUCH A HOUSING AND METHOD FOR ADDITIVELY MANUFACTURING SUCH A HOUSING

CROSS REFERENCE TO RELATED APPLICATIONS

This patent application is a U.S. national stage application of International Application No. PCT/EP2022/056016, filed Mar. 9, 2022, which claims priority to German Patent Application No. 10 2021 106 730.8, filed Mar. 18, 2021, each of which is incorporated herein by reference in its entirety.

BACKGROUND

Field

The disclosure relates to a housing for a valve, in particular a control valve housing, or a fitting, and to a semi-finished product therefor, the body of which is formed in layers with the aid of an additive manufacturing process. The disclosure also relates to methods for additive manufacturing of a housing for a valve or a fitting.

Related Art

A housing for a valve, such as a control valve, or a fitting generally includes a housing body having an inlet channel and an outlet channel for the process fluid of a process fluid processing plant, and a bridge section formed between the inlet channel and the outlet channel in the operational flow direction of the process fluid. The process fluid processing plant may be, for example, a chemical plant, such as a petrochemical plant, a power plant, a food processing plant, such as a brewery, or the like. An inlet and outlet opening is provided at each of the inlet and outlet channels, respectively, which can be connected to a process fluid line upstream or downstream of the housing, for example, by means of a flanged connection. An opening for the process fluid is provided at the bridge section of the housing, which, according to operation, in cooperation with a movable closing and/or actuating member, such as a valve plug, or the like, can provide different actuating states, for example open, closed as well as possibly intermediate states with partially closed bridge opening, for a valve for adjusting the process fluid flow. The closing member of the fitting or actuator of the control valve is movably mounted in the housing, in particular translationally or rotationally. The actuator usually has an actuating rod or shaft by means of which it is connected to an adjustment actuator. The adjustment actuator can be operated pneumatically, hydraulically and/or electrically, for example. The adjustment actuator may be attached to the housing by means of a yoke, lantern, or the like, or directly a cover, wherein the cover as well as optionally the yoke or the like is attached to the neck region of the housing. The actuating rod or shaft is generally guided through the neck region to the interior of the housing, to the bridge section. The housing may be provided with inserts or be integrally formed, for example, a valve seat at the opening through the bridge section and/or a valve cage disposed in extension of the opening through the bridge section. The valve seat and/or the valve cage can, in cooperation with the valve member, define the functionality and adjustability of the valve, in particular the control valve, or the fitting. In a valve, in particular a control valve, an actuator, for example a disc, a plug, a ball or a needle, can be moved relative to a valve seat to allow process fluid flows of different sizes in different relative positions of the actuator relative to the valve seat, as well as to prevent process fluid flow in a sealing position, if necessary. Fitting can generally be used to refer to a shut-off element that is designed and adapted to allow a process fluid flow in a first operating state and to prevent it in a second operating state. A fitting can, for example, be embodied as a gate valve, butterfly valve or ball valve.

Additive manufacturing processes are used for individual components of a control valve to bring about significant technical improvements that could not be achieved using conventional manufacturing processes. For example, EP 3 289 262 B1 describes an additively manufactured throttle body for a control valve, which can, for example, realize the valve member or a valve cage, which is formed with a plurality of channels running in the shape of a space spiral. The control valve housing surrounding the throttle body is conventionally manufactured.

Control valve housings for process control valves generally have complex geometries that can be conventionally produced, for example, in a sand-casting process. Control valve housing bodies produced in conventional casting processes have regions that are mechanically post-processed. For example, the transition surfaces at the inlet, outlet, or neck region may be face milled. Further, for example, fits and/or threads are produced by machining to provide sealing surfaces or centering to receive adjacent parts. Often, the opening in the bridge region is post-processed by machining, where an insert for the valve seat or valve cage and, if necessary, a seal are to be positioned. In particular in the region of the channel structure carrying process fluids, complex three-dimensionally curved macroscopic geometries are often provided, which must not be subjected to mechanical post-processing under any circumstances. This is because edges and steps must be avoided to ensure undisturbed process fluid flow along the three-dimensionally curved inner surfaces of the channel structure, because otherwise undesirable turbulence can occur, which can impair the functionality of the control valve.

A sand-casting process with partial additive manufacturing of the cast is partially described in WO 2017 196 513 A1.

WO 2017 066 215 A1 describes the additive manufacturing of a control valve housing, wherein volume sections are to be realized in a weight-saving manner by a grid or cell structure. WO 2017 066 215 A1 assumes that additive manufacturing eliminates the limitations associated with conventional manufacturing processes. However, it has been found in practice that unknown problems arise in the three-dimensional manufacturing of macroscopic structures, in particular those made of metal, from conventional manufacturing. An example of an additive manufacturing process is the so-called powder bed process. In the powder bed process, metal powder is applied in layers in a built-up direction and a control valve housing body is formed by laser melting of the powder. It has been found that in some cases the powder bed provides insufficient static stability, so that molten powder material sinks into the powder bed, resulting in undesirable deviations from a desired geometry. However, deviations from the desired geometry should not exceed the tolerance ranges in conventional casting production. Furthermore, the powder bed is deformed during sinking. Severe sinking can guide the machine control system to abort or even destroy the component.

It is known that additional support structures, for example ribs, are provided at locations which can lead to increased such failures during additive manufacturing. These support structures have to be removed at great expense in an additional work step following additive manufacturing. However, as mentioned above, there are regions, in particular in the channel structure of the control valve housing, which should not undergo any machining post-processing, or where, in the case of machining post-processing, a particularly complex CNC programming for the machining tool, such as a milling machine, as well as possibly a further, complex and error-prone manual hand-grinding work step is required.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 a side view of an additively manufactured control valve housing, according an exemplary embodiment of the disclosure, with built-up direction parallel to the stroke-actuating direction.

Figure 2:
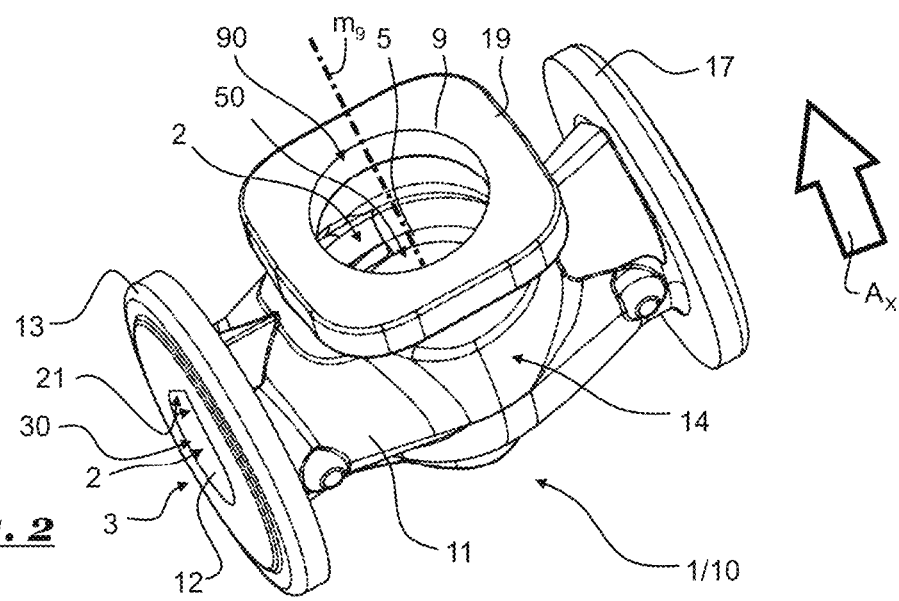

FIG. 2 a perspective view of the control valve housing according to FIG. 1.

Figure 3:
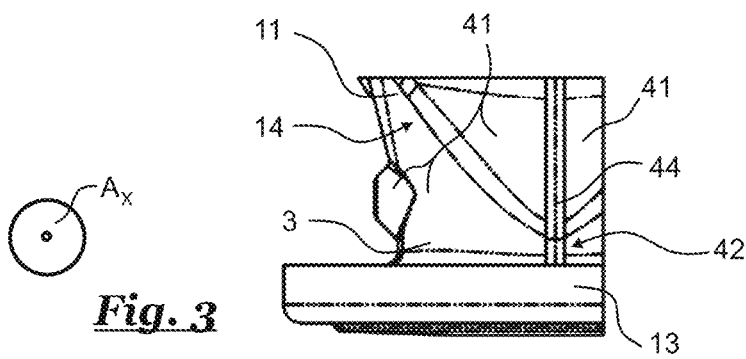

FIG. 3 a detailed bottom view of the control valve housing according to FIG. 1.

Figure 4:
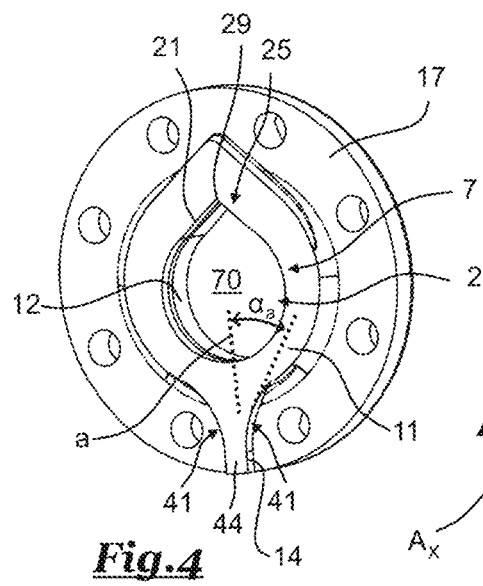

FIG. 4 a schematic sectional view through the outlet channel of the control valve housing according to FIG. 1.

Figure 5:
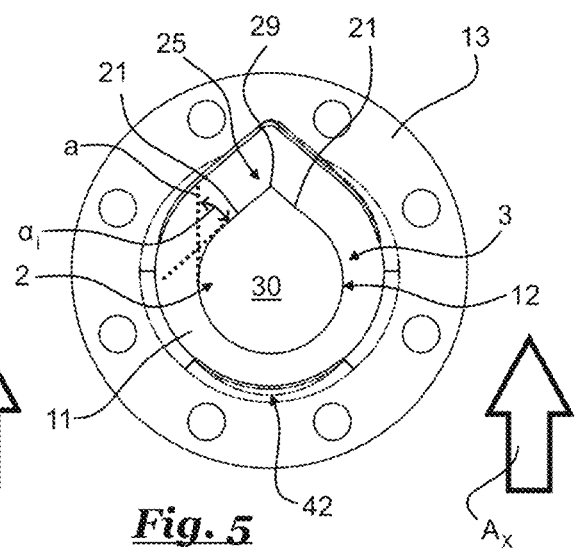

FIG. 5 a schematic sectional view through the inlet channel of the control valve housing according to FIG. 1.

Figure 6:
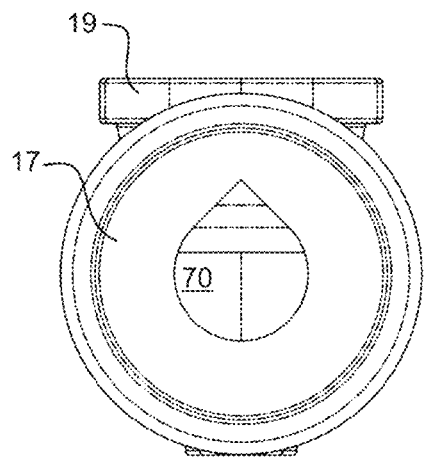

FIG. 6 a front view of the outlet opening of the control valve housing according to FIG. 1.

Figure 7:
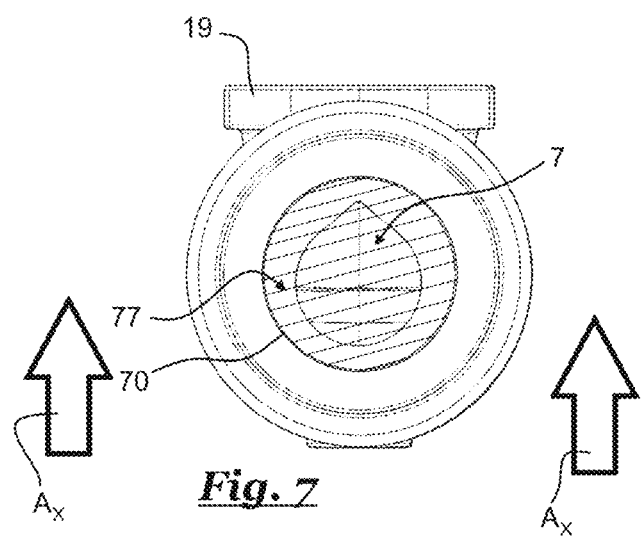

FIG. 7 a schematic front view of an outlet opening of a control-valve-housing-semi-finished product according to an exemplary embodiment of the disclosure.

Figure 8:
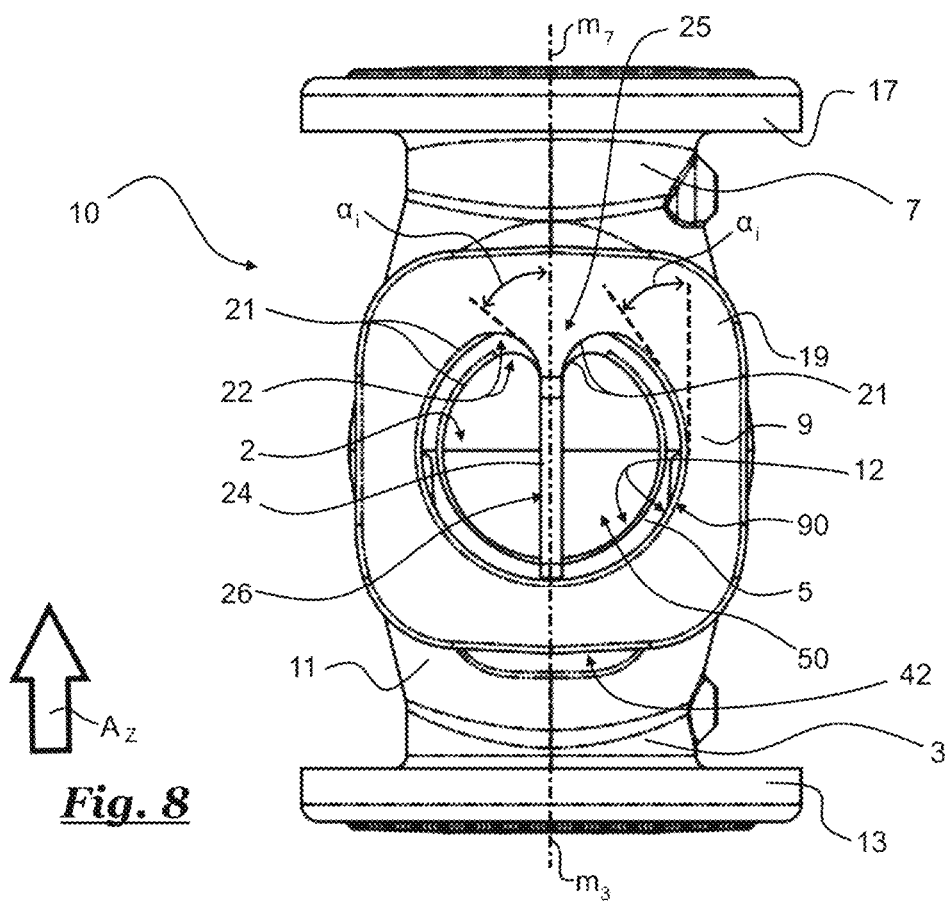

FIG. 8 a top view of an additively manufactured semi-finished product, according to an exemplary embodiment of the disclosure, with build-up direction parallel to the inlet channel with a support rib in the neck region.

Figure 9:
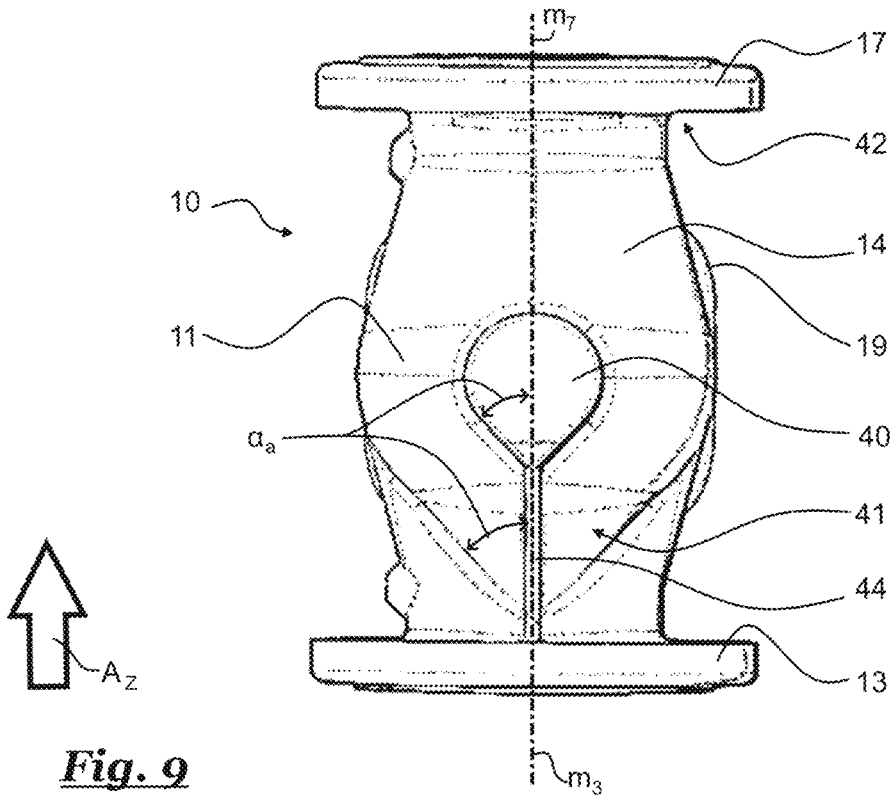

FIG. 9 a bottom view of the semi-finished product shown in FIG. 8.

Figure 10:
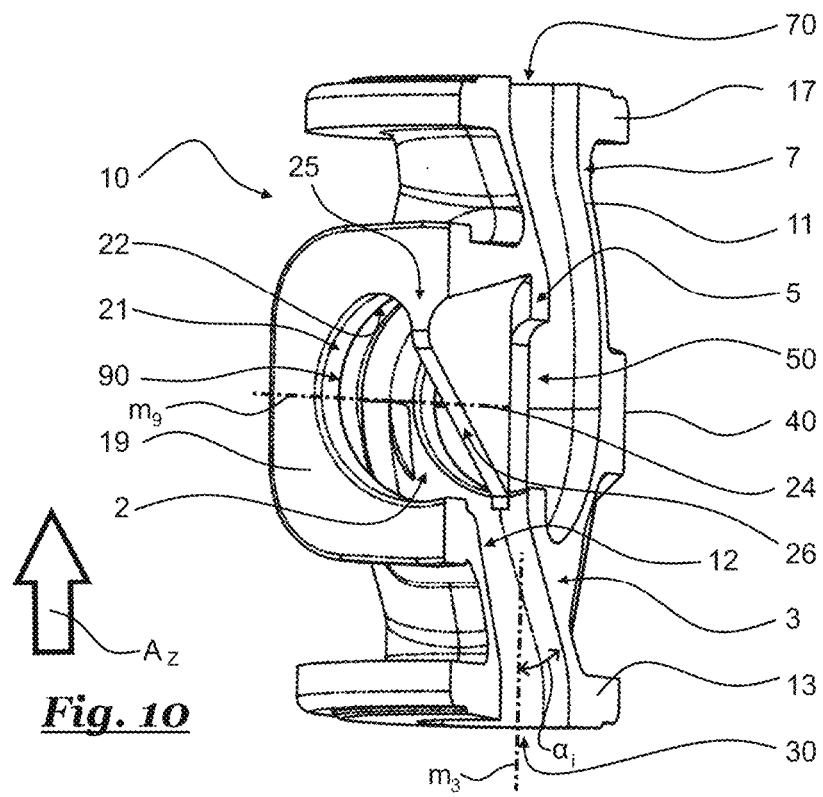

FIG. 10 a schematic sectional view of the body of the semi-finished product according to FIG. 8.

Figure 11:
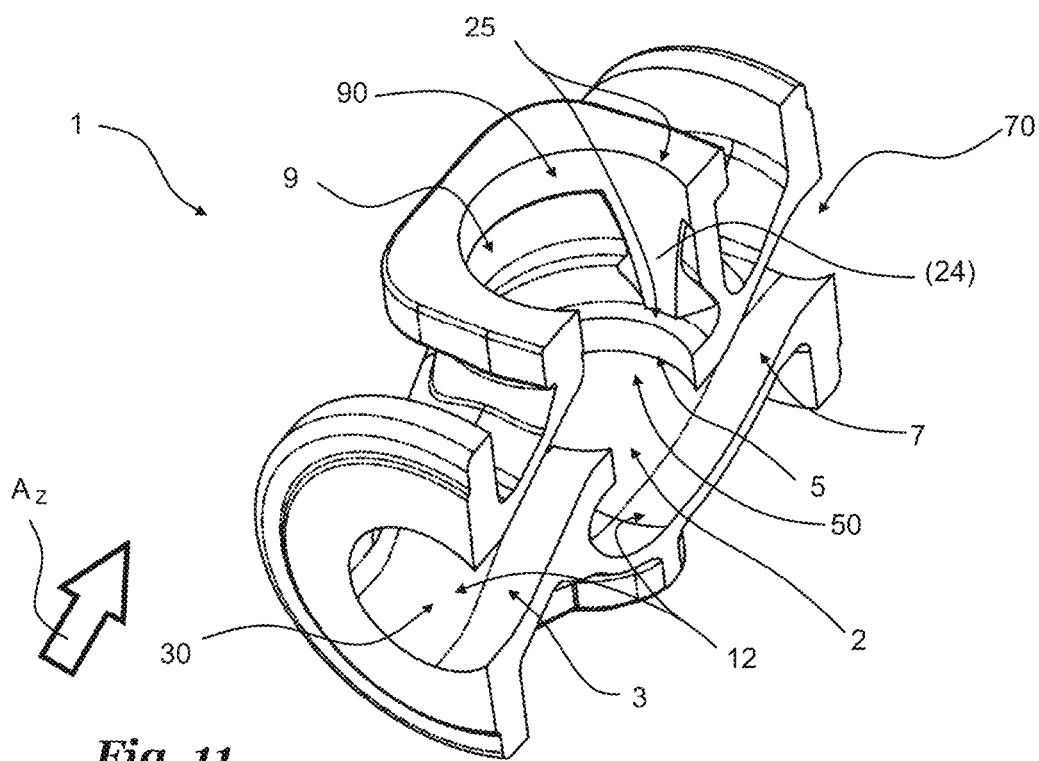

FIG. 11 a sectional view of an actuator housing formed from a semi-finished product according to FIG. 8 by removing the support rib.

Figure 12:
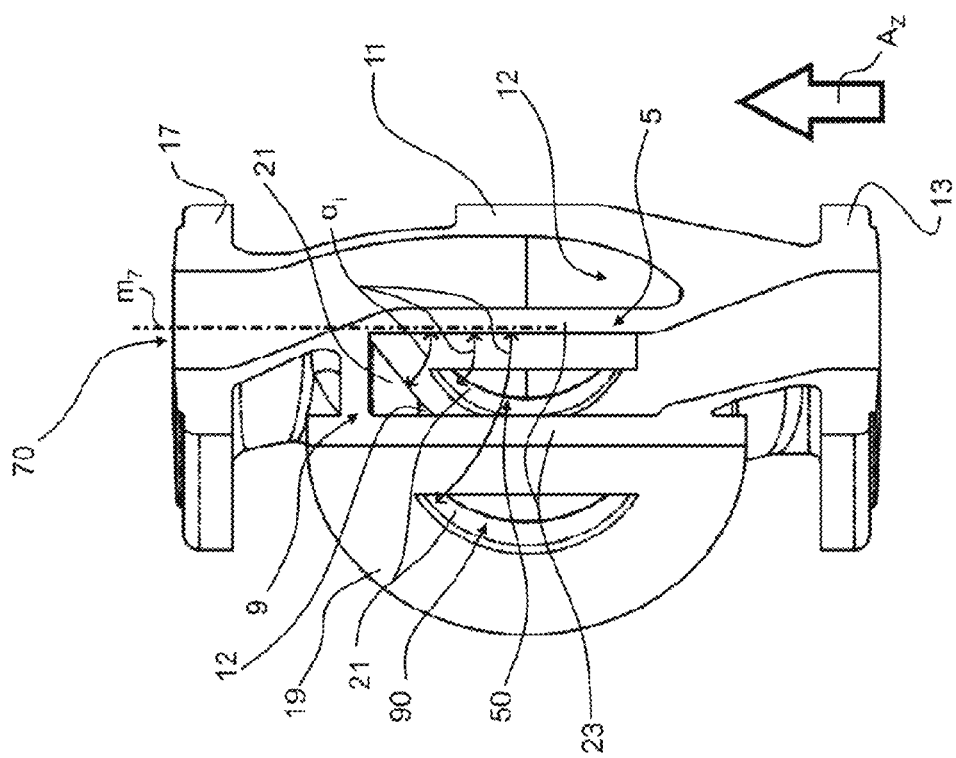

FIG. 12 a sectional view of an additively manufactured semi-finished product, according to an exemplary embodiment of the disclosure, with built-up direction parallel to the inlet channel and two support struts.

Figure 13:
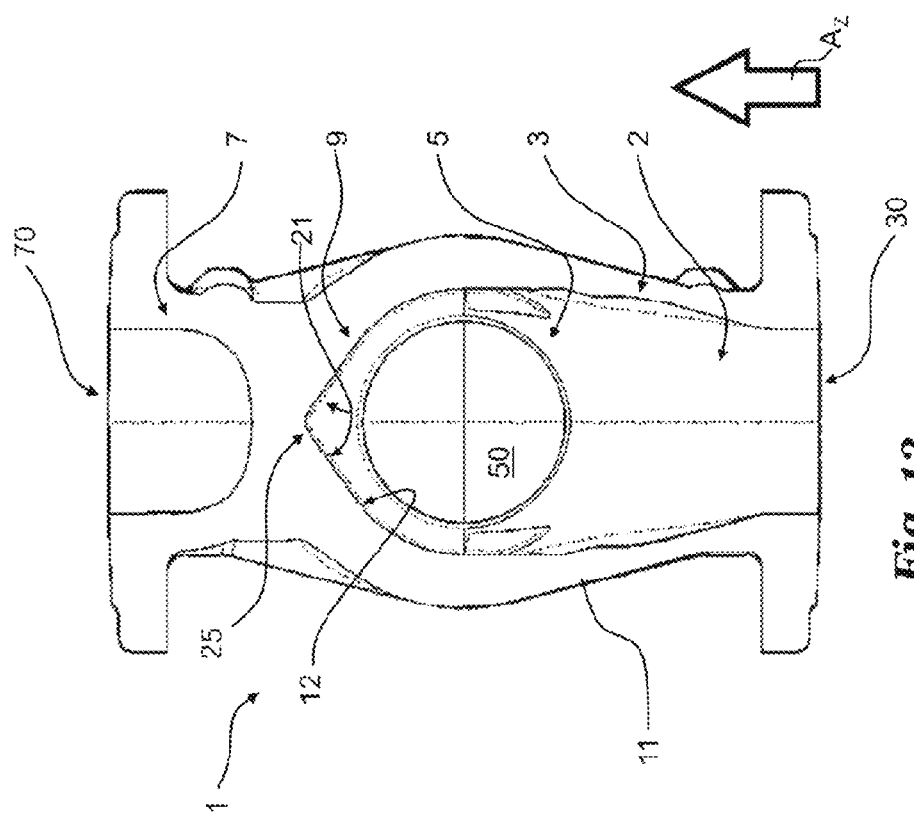

FIG. 13 a sectional view of an actuator housing according to an exemplary embodiment of the disclosure.

Figure 14:
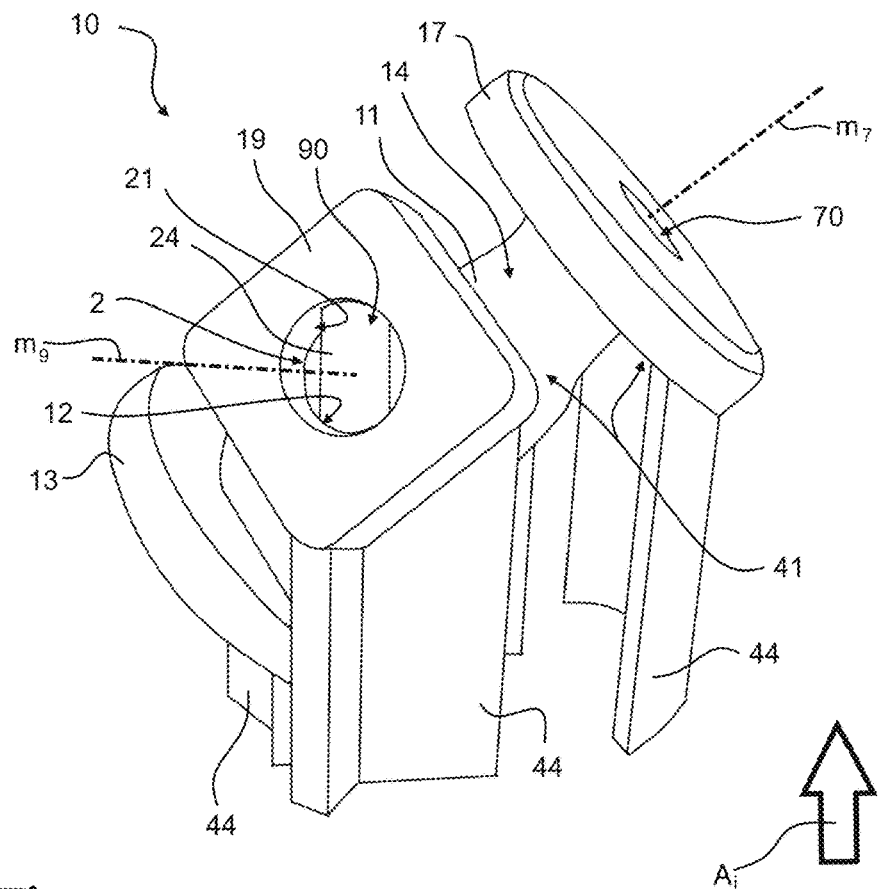

FIG. 14 a perspective view of a semi-finished product with an inclined built up direction, according to an exemplary embodiment.

Figure 15:
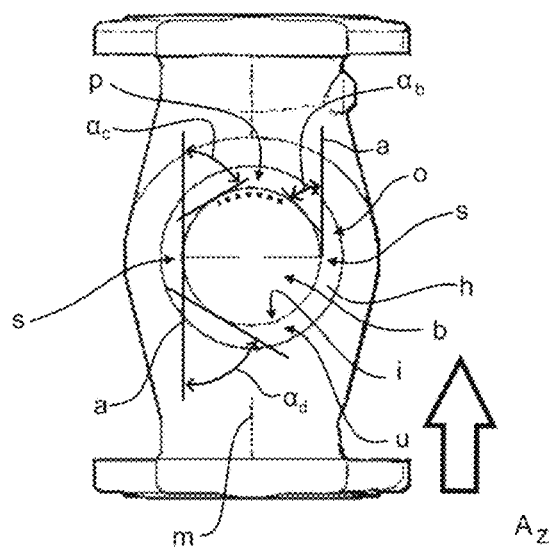

FIG. 15 a top view of a conventional control valve housing.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, and components have not been described in detail to avoid unnecessarily obscuring embodiments of the disclosure.

It is an object of the disclosure to overcome the disadvantages of conventional techniques, including to provide a semi-finished product, a housing for a fitting or a valve, such as a control valve, and/or a process for manufacturing such a housing, in which casting manufacturing tolerances are reliably maintained. A further object is to reduce or completely avoid the requirement for machining, in particular manual, post-processing.

Accordingly, a semi-finished product (e.g., an additively manufactured product) is provided for a housing for a fitting or a valve, such as a control valve. The semi-finished product may include an additively manufactured body having a built-up direction in which the body is formed in layers. Various manufacturing processes may be considered for additively building the body in layers, such as laser sintering and/or another 3D printing process. The body comprises an inlet channel, the outlet channel, a bridge section, and a neck region for the housing. The inlet channel, the outlet channel, the bridge section, and the neck region delimit a channel structure to be formed for the process fluid. The channel structure defines the space surrounding the process fluid during operational use of the fitting or the valve. In particular, the channel structure formed by the body may be configured to be in direct contact with the process fluid during operation. The body forms an inner surface to be directed towards the process fluid and an outer surface to be facing the surroundings. The channel structure is delimited by sections of the inner surface. The built-up direction may correspond, for example, to a center line of the of the inlet channel, particularly at the inlet opening, of the outlet channel, particularly at the outlet opening, to the neck region, particularly at a neck collar opening. The built-up direction may alternatively or additionally be selected to correspond to a setting direction of the actuator. The material for forming the body is preferably a powder material. The powder material preferably has a particle size distribution according to D10: 5 µm to 50 µm, in particular 15 µm to 30 µm, preferably 21 µm, and/or D50: 15 µm to 65 µm, in particular 25 µm to 45 µm, preferably 34 µm, and/or D90: 20 µm to 100 µm, in particular 35 µm to 65 µm, preferably 50 µm. In particular, a material forming the body may comprise or consist of metal. The metal material may be a weldable metal material, in particular according to CEN ISO TR 15608. For example, the metal material may be from material group 8 (stainless steels), in particular 8.1 (austenitic stainless steels). According to one embodiment, the metal material may comprise or consist of X5CrNiMo17-12-2 (1.4401) DIN EN 10088. Alternatively, or additionally, the metal material may comprise or consist of stainless steel according to S31600 (so called stainless steel grade 316) and/or to S31603 (so called stainless steel grade 316L). The metal material forming the body may be selected from the group consisting of steel, preferably stainless steel, duplex steel, nickel-based alloys, titanium, titanium alloys, aluminum, aluminum alloys, or mixtures, in particular alloys, of the aforementioned materials. In particular, the semi-finished product may have a cross-sectional size of at least 10 mm, in particular at least 100 mm, preferably at least 200 mm, and/or a cross-sectional size of not more than 1000 mm, in particular not more than 500 mm, preferably not more than 300 mm. Alternatively or additionally, the semi-finished product may in particular have a height of at least 10 mm, in particular at least the 100 mm, preferably at least 200 mm and/or a height of not more than 1000 mm, in particular not more than 600 mm, preferably not more than 400 mm. According to one embodiment, semi-finished product may have a weight of not more than 1000 kg, in particular not more than 500 kg, preferably not more than 250 kg and/or a weight of at least 1 kg, in particular at least 5 kg, preferably at least 10 kg or at least 25 kg.

According to the disclosure, the inner and/or the outer surface may have at least one overhang surface with respect to the built-up direction, the overhang angle of which does not exceed an angular threshold value of at most 75°. The built-up direction corresponding to the vertical direction during the layer wise, additive manufacturing of the body need not necessarily correspond to the vertical direction of the valve housing in an operationally correct installed state. An overhang surface exists where an inner or outer surface of the body deviates from the built-up direction such that, with respect to the built-up direction, a clearance is formed below the surface and the body is formed above. The inner and/or the outer surface that has an overhang angle is preferably a continuously, at least two-dimensionally, in particular three-dimensionally, curved surface. A two-dimensional curved surface is, for example, a cylindrical circumferential surface. A three-dimensional curved surface is, for example, a spherical circumferential surface. In particular, the inner and/or the outer surface is continuously curved with the overhang angle not being greater than the angular threshold value, wherein in particular the surface has a varying angle of curvature. According to a simple example, a circumferential surface of a cylinder with an elliptical cross-section has a varying angle of curvature, or a saddle surface that is convexly (parabolic or hyperbolic) curved with respect to a first axis and concavely (parabolic or hyperbolic) curved with respect to a second axis, being orthogonal to the first. A continuously three-dimensional curved surface having varying angles of curvature is referred to as a freeform surface in the context of the present disclosure. It should be understood that the inner surface or the outer surface may be a free-form surface which does not form an overhang angle exceeding the angular threshold value at any point with respect to the built-up direction. Surprisingly, it has been shown that, in the case of a shape design, wherein an angle of inclination or overhang angle of overhang surfaces with respect to the built-up direction is dimensioned not greater than the angular threshold value, a shape deviation of the additively manufactured body from a nominal shape smaller than the tolerance range of conventional casting production can be ensured.

It should be understood that the angular threshold value is present in at least one cross-sectional plane which is spanned by the built-up direction and a primary transverse direction oriented transversely, in particular orthogonally, to the built-up direction. In an exemplary embodiment, the primary transverse direction corresponds to a direction transversely, in particular orthogonally, with respect to the operational main flow direction from inlet opening to outlet opening and/or the stroke direction of the fitting or the valve formed with the body. At the overhang surface(s), the angle of inclination need not be less than or equal to the angular threshold value with respect to any cross-sectional plane with respect to transverse directions other than the primary transverse direction. It may be preferred that even in cross-sectional planes which are offset relative to the built-up direction with respect to the primary cross-sectional direction by at least 2°, in particular at least 5°, preferably at least 10°, and/or not more than 20°, in particular not more than 15°, preferably not more than 11°, the overhang inclination is not greater than the angular threshold value.

According to one embodiment of a semi-finished product, the angular threshold value is at most 70°, in particular at most 60°. Alternatively, or additionally, the angular threshold value can be at least 20°, in particular at least 30°. In an exemplary embodiment, the angular threshold value can be in the range of 40° to 50°.

According to an exemplary embodiment, a plurality of, in particular all, inner overhang surfaces of the inner surface have overhang angles smaller than or equal to the angular threshold value. In particular, the major part, preferably at least 90%, at least 95% or at least 99%, of the inner overhang surfaces are formed with an overhang angle smaller than or equal to the angular threshold value. In an exemplary embodiment, the inner overhang surfaces in the region of the inlet channel, in the region of the bridge section, in the neck region and/or in the region of the outlet channel have overhang angles smaller than or equal to the angular threshold value. In the context of the disclosure, the inner overhang surfaces may be formed in narrow overhang regions, for example in the region of a channel structure vertex, with overhang angles greater than the angular threshold value, wherein in particular such inner overhang regions have a horizontal width of not more than 10 mm, in particular not more than 5 millimeters. A narrow overhang region can be provided, for example, as a radius along an intersection line of two horizontally opposite and oppositely inclined overhang surfaces. In an exemplary embodiment, such overhang regions are delimited on both sides in the horizontal direction with respect to the built-up direction, for example by vertical surfaces or by overhang surfaces with an overhang angle smaller than or equal to the angular threshold value. It is conceivable that overhang regions of the semi-finished product are supported by means of one or more ribs.

In an embodiment of the semi-finished product which can be combined with the previous ones, a plurality of, in particular all, outer overhang surfaces of the outer surface have overhang angles smaller than or equal to the angular threshold value. In particular, a major part, preferably at least 60%, at least 80% or at least 90%, of the outer overhang surfaces are formed with an overhang angle smaller than or equal to the angular threshold value. Within the scope of the disclosure, the outer overhang surfaces may be formed in particular narrow overhang regions, for example in the region of a flange section at inlet, outlet and/or neck collar opening, or in a lower foot region, with overhang angles greater than the angular threshold value, wherein in particular such outer overhang regions have a horizontal width of not more than 10 mm, in particular not more than 5 millimeters. In an exemplary embodiment, such overhang regions are delimited on both sides in the horizontal direction with respect to the built-up direction, for example by vertical surfaces or by overhang surfaces with an overhang angle smaller than or equal to the angular threshold value. It is conceivable that outer overhang regions of the semi-finished product are supported by means of one or more ribs.

According to another semi-finished product embodiment which can be combined with the previous ones, wherein the body which surrounds the channel structure of the fitting or the valve to be formed has, in the region of a vertex of the channel structure to be formed with respect to the built-up direction, two, in particular in the horizontal direction, mutually opposite surfaces, in particular opposingly inclined overhang surfaces, which form a vertex tip. A channel structure whose cross-section has a vertex tip at an uppermost point (vertex) in the built-up direction or vertical direction may be designated as a channel structure with a drop-shaped cross-section. For example, the vertex tip may be gable arch shaped, which may be formed by two sectionally planar overhang surfaces crossing each other at an angle, preferably mirror symmetrically. Alternatively, the vertex tip may be, for example, ogival arch shaped, preferably formed by two, in particular two-dimensionally, curved, preferably mirror symmetrical, overhang surfaces. In particular, the inner surfaces can have in the region of the vertex an overhang inclination smaller than or equal to the angular threshold value. Alternatively, the inner overhang surfaces may at the vertex form an overhang region with overhang angles greater than the angular threshold value, wherein in particular the overhang region forms a transition radius between the opposing overhang surfaces, as described above.

According to a special embodiment of the semi-finished product, the semi-finished product has, in the region of a circular opening to be formed in the housing, in particular in the control valve housing, such as in the bridge section (valve seat opening), in the neck section (neck collar opening) for support transversely to the neck and/or bridge section with respect to a built-up direction, or at an inlet opening and/or an outlet opening transversely to the inlet and/or outlet channel with respect to the built-up direction, a support structure at least partially covering the opening, in particular closing it over its entire surface. In such an embodiment of a semi-finished product, machining post-processing is performed on the opening covered by the support structure, for example by drilling and/or milling, to form the final fitting or valve housing. In the case of a housing for a fitting or a valve, it is generally envisaged, in particular in accordance with standards, that openings for connecting the channel structure to adjacent components are circular and may undergo machining post-processing.

According to one embodiment, a semi-finished product is provided comprising or consisting of a metal material, in particular a steel alloy. In an exemplary embodiment, the metal material includes at least one alloy component selected from the group consisting of Cr, Ni, Mo, Nb and Ti.

The disclosure also relates to a housing, for a fitting or a valve, in particular a control valve, of a processing plant, such as a chemical plant, a power plant, a food processing plant, or the like. The housing comprises an additively manufactured body having a built-up direction in which the body is formed in layers. In particular, the body of the housing, in particular the valve or fitting housing, may correspond to the aforementioned semi-finished product. In particular, a material forming the body may comprise or consist of metal. The material for forming the body may be a powder material. The powder material may have a particle size distribution according to D10: 5 µm to 50 µm, in particular 15 µm to 30 µm, preferably 21 µm, and/or D50: 15 µm to 65 µm, in particular 25 µm to 45 µm, preferably 34 µm, and/or D90: 20 µm to 100 µm, in particular 35 µm to 65 µm, preferably 50 µm. In an exemplary embodiment, the metal material forming the body may be selected from the group consisting of steel, preferably stainless steel, duplex steel, nickel-based alloys, titanium, titanium alloys, aluminum, aluminum alloys, or mixtures, in particular alloys, of the aforementioned materials. In an exemplary embodiment, the metal material may be a steel alloy, wherein at least one alloy component may be selected from the group comprising Cr, Ni, Nb, Ti, and/or Mo. In particular, the metal material may be a steel alloy comprising Cr and Ni and at least one further alloy component selected from the group comprising Nb, Ti, and/or Mo. In an exemplary embodiment, the steel alloy comprises a carbon content of not more than 0.5% (%-information are to be understood as information in mass %, in particular according to DIN EN 10088-3), in particular not more than 0.1%, preferably not more than 0.07%, particularly preferably not more than 0.03%. Alternatively, or additionally, the steel alloy comprises a chromium content in the range from 10% to 25%, in particular in the range from 15% to 20%, preferably in the range from 16.5% to 18.5%. Alternatively, or additionally, the steel alloy may include a nickel content in the range from 5% to 20%, particularly in the range from 7.5% to 15%, preferably in the range from 10.0% to 13.0%. Additionally, or alternatively, the steel alloy comprises a molybdenum content in the range from 0.5% to 5%, particularly in the range from 1.5% to 3%, preferably in the range from 2.0% to 2.5%. In an exemplary embodiment, the steel alloy consists of Fe, C, Cr, Mo, and Ni (as well as any impurities of, for example, no more than 1% Si, no more than 2% Mn, no more than 0.045% P, no more than 0.03% S, and/or no more than 0.1% N). The metal material may be a weldable metal material, in particular according to CEN ISO TR 15608. For example, the metal material may be selected from material group 8 (stainless steels), in particular 8.1 (austenitic stainless steels). According to one embodiment, the metal material may comprise or consist of X5CrNiMo17-12-2 (1.4401) DIN EN 10088. Alternatively, or additionally, the metal material may comprise or consist of stainless steel according to S31600 (so-called stainless steel grade 316) and/or 1.4404 X2CrNiMo17-12-2 and or S31603 (so-called stainless steel grade 316L). The body includes an inlet channel, the outlet channel, a bridge section, and a neck region for the fitting or the valve housing. The inlet channel, outlet channel, bridge section, and neck region delimit a channel structure for the process fluid. The channel structure defines the space surrounding the process fluid during operational use of the fitting or the valve, in particular control valve.

In particular, the channel structure may be in direct contact with the process fluid during operation. Alternatively, the channel structure can be provided on the inner side with a coating, in particular a polymer layer, which shields the process fluid and the material of the body from each other, for example to keep, corrosive process fluids away from the metal material of the body, or to prevent contamination of the process fluid by metal material of the body. The body forms an inner surface to be directed towards the process fluid and an outer surface to be facing the surroundings. The channel structure is delimited by sections of the inner surface. The built-up direction may correspond, for example, to a center line of the of the inlet channel, particularly at the inlet opening, of the outlet channel, particularly at the outlet opening, to the neck region, particularly at a neck collar opening. The built-up direction can alternatively or additionally be selected to correspond to a setting direction of the actuator.

According to the disclosure, the inner or the outer surface has at least one overhang surface with respect to the built-up direction, the overhang angle of which does not exceed an angular threshold value of at most 75°.

In one embodiment of a housing, in particular a fitting or valve housing, such as a control valve housing, at least one flange section, in particular in the region of the inlet opening, the outlet opening and/or the neck collar opening, may be attached as separate opponents to the additively manufactured body. The flange sections for connecting the body to adjacent components, for example a tube, a cover, a yoke or the like, protrude laterally circumferentially from the sections of the body forming the channel structure, so that, depending on the built-up direction selected, the angular threshold value can often be exceeded at these points. Therefore, in an exemplary embodiment, the process may include to additively form the semi-finished product free of one or more flange sections in order to connect the flange sections, which may be, for example, machiningly manufactured, for forming the housing with the additively manufactured body, for example in a material-locking manner. The contact region between the additively manufactured body and the attached flange section may be formed in a form-complementary manner, for example frustoconical.

According to one embodiment of a housing, in particular fitting or valve housing, the inner surface to be directed to the process fluid is, in the region of the inlet channel and/or the outlet channel, with the exception of the inlet opening, the outlet opening, a neck collar opening and/or a bridge opening, free from machiningly post-processed sections. In particular, the inner surface includes free-form surfaces defining the channel structure that are free from machiningly post-processed sections. In particular, of the free-form surfaces defining the inner surface, at least 90%, in particular at least 95%, preferably at least 99% are free from machiningly post-processed sections. In an exemplary embodiment, in a further development of a housing with built-up direction corresponding to a center line at the inlet and/or outlet, the inner surface in the region of the inlet channel and the outlet channel is free from machiningly post-processed sections. In another further development of a housing, in particular a fitting or valve housing, with a built-up direction corresponding to a center line of the neck collar opening and/or corresponding to a stroke direction of the fitting or valve, in particular the control direction of the control valve, the bridge section and the neck section are free from machiningly post-processed sections.

In one fitting of a housing, in particular a fitting or valve housing, in particular made from a semi-finished product manufactured with a support structure, the inlet opening, the outlet opening, the neck collar opening and/or the bridge opening is formed by machining post-processing of the additively manufactured body, in particular with a circular cross-section. In particular, the housing, in particular fitting or valve housing, comprises a flow divider which is formed at least sectionally from a support structure, such as a web or a rib, which has been partially removed, in particular by machining post-processing.

According to an alternative embodiment, the housing, in particular fitting or valve housing, comprises an additively manufactured body that is free from machiningly post-processed sections, at least on the inner surface. In particular, the housing comprises or consists of an additively manufactured body that is formed free of a support structure, at least on the inner surface. In addition, the outer surface may also be formed largely, in particular at least 60%, at least 80% or at least 90%, preferably completely, free from machiningly post-processed sections. The outer surface of the housing may have more machiningly post-processed sections than the inner surface, since machining post-processing is to be avoided, in particular with regard to the flow conditions in the channel structure. Desire rather than avoidance of additional working steps speaks in favor of minimizing reworking of both the inner and outer surfaces.

The disclosure further relates to a method for additively manufacturing a housing for a fitting or a valve (fitting or valve housing), in particular a housing formed as described above, in particular a fitting or valve housing, preferably a control valve housing. In the method, a built-up direction is first defined. For example, the built-up direction can be selected to correspond with a center line at an opening to be formed, such as a neck collar opening, an inlet opening and/or an outlet opening. Alternatively, a built-up direction may be defined to be offset and/or inclinedly aligned, for example 50°, with a center line at an opening, such as a neck collar opening, an inlet and/or outlet opening. In the method of additively manufacturing a housing, a body of the housing is formed successively in layers in the built-up direction in such a manner that the body is provided with an inlet channel, an outlet channel, a bridge section, and a neck region for the housing, by which a channel structure to be formed for a process fluid is delimited. The body is formed with an inner surface to be directed to the process fluid and an outer surface to be facing the surroundings. According to the disclosure, the inner surface and/or outer surface is formed with at least one overhang surface with respect to the built-up direction. In this case, the overhang surface defines an overhang angle with respect to the built-up direction. In the method for additive manufacturing of a housing according to the disclosure, the overhang surface or surfaces is or are formed such that they do not exceed an angular threshold value. Surprisingly, it has been found that deviations from a nominal geometry below the tolerance range customary for castings can be achieved in this way.

According to one embodiment, the built-up direction can be defined parallel to a center line of an inlet channel and/or outlet channel, in particular at the inlet opening or at the outlet opening. Alternatively, the built-up direction can be defined parallel to a center line of the neck section, in particular the neck collar opening and/or the bridge opening. According to another alternative embodiment, it is conceivable that a built-up direction is defined deviating from the center line of the neck section, the inlet channel and the outlet channel. For example, a built-up direction can be offset and/or oriented inclinedly to the center line of the inlet channel, the outlet channel, and/or the neck section.

The angular threshold value is determined in advance, in particular implicitly or explicitly, as part of the additive manufacturing process. The angular threshold value can be determined considering at least one further process parameter. In particular, the angular threshold value can be determined as a function of at least one further process parameter. When determining the angular threshold value, among other things, a process parameter such as laser exposure, laser power, and/or laser speed can be considered. It can be provided, for example, that a laser melting device, such as TRUMPF TruPrint 3000 or TruPrint 5000, with a 10 µm, 20 µm, 30 µm, 40 µm, 50 µm, 60 µm, 70 µm, 80 µm, 90 µm and/or 100 µm parameter set is used for additive manufacturing. It can be provided that the parameter set defines a layer height of the additive manufacturing process.

A single angular threshold value can be defined for the surfaces of the entire housing, in particular fitting or valve housing. It is conceivable that with respect to the inner surface an inner angular threshold value is defined which is different from an outer angular threshold value with respect to the outer surface. In particular, the angular threshold value can be defined as a settlement of no more than 75° overhang inclination with respect to the built-up direction. In an exemplary embodiment, the additive manufacturing of the body of the housing, is implemented using a powder bed process (e.g. powder bed based fusion, PBF) and/or laser sintering process. The angular threshold value can be set to at most 70°, in particular at most 60°, with respect to the built-up direction. Alternatively, or additionally, the angular threshold value can be determined to be at least 20°, in particular at least 30°, with respect to the built-up direction. In an exemplary embodiment, the angular threshold value is determined in the range of 40° to 50° with respect to the built-up direction.

In one embodiment of the additive process for manufacturing a housing, in particular a fitting or valve housing, a plurality of, in particular all, inner overhang surfaces of the inner surface are formed additively with an overhang angle smaller than or equal to the angular threshold value. In particular, the major part, preferably at least 90%, at least 95% or at least 99%, of the inner overhang surfaces are formed additively with an overhang angle smaller than or equal to the angular threshold value. In an exemplary embodiment, the inner overhang surfaces in the region of the inlet channel, in the region of the bridge section, in the neck region and/or in the region of the outlet channel are formed additively with an overhang angle smaller than or equal to the angular threshold value. In the context of the disclosure, the inner overhang surfaces may be additively formed in narrow overhang regions, for example in the region of a channel structure vertex, with overhang angles greater than the angular threshold value, wherein in particular such inner overhang regions have a horizontal width of not more than 10 mm, in particular not more than 5 mm. For example, a narrow overhang region can be additively formed as a radius along a hypothetical intersection line of two horizontally opposite and oppositely inclined overhang surfaces.

According to another embodiment, which can be combined with the previous ones, a plurality of, in particular all, outer overhang surfaces of the outer surface are formed additively with an overhang angle smaller than or equal to the angular threshold value. In particular, a major part, preferably at least 60%, at least 80% or at least 90%, of the outer overhang surfaces with an overhang angle smaller than or equal to the angular threshold value are formed additively. Within the scope of the disclosure, the outer overhang surfaces may be additively formed in particularly narrow overhang regions, for example in the region of a flange section at inlet, outlet and/or neck collar opening, or in a lower foot region, with overhang angles greater than the angular threshold value, wherein in particular such outer overhang regions have a horizontal width of not more than 10 mm, in particular not more than 5 mm. In an exemplary embodiment, larger outer overhang regions with a width of at least 5 mm, in particular at least 10 mm, preferably at least 30 mm, are formed only after additive manufacturing, for example by machining post-processing and/or by adding separate components, for example flange components.

In one embodiment of the manufacturing process, at least one flange section, in particular in the region of the inlet opening, the outlet opening and/or the neck collar opening, is placed as a separate component on the additively manufactured body.

According to a further embodiment of a manufacturing method, the body surrounding the channel structure of the valve or fitting to be formed, is formed in the region of a vertex of the channel structure to be formed with respect to the built-up direction by two mutually opposing inner overhang surfaces, by which a, vertex tip is formed. The vertex tip can be formed, for example, in an ogival arch shaped manner, with continuously curved inner overhang surfaces of increasing overhang inclination, or in a gable arch shaped manner, with sectionally flat inner overhang surfaces of constant overhang inclination.

According to an alternative embodiment of the manufacturing method, the body is formed in the region of the bridge section and/or the neck region with at least one support structure, such as a web and/or a rib, for supporting a vertex of the channel structure of the fitting or valve to be formed, which vertex is related to the built-up direction, wherein in particular the support structure is formed with an overhang inclination at a support structure surface of not more than the angular threshold value. The support structure surface describes the inner surface of the body at the support structure directed towards the channel structure.

Additionally, or alternatively, in one embodiment of the manufacturing process, the body can be additively formed in the region of a circular opening of the housing, in particular fitting or valve housing, to be formed, such as in the bridge section or in the neck section for support with respect to a built-up direction transversely to the neck section, with a support structure closing the opening, in particular over its entire surface. Alternatively, the body can be additively formed in the region of a circular opening of the housing to be formed, such as the inlet opening and/or the outlet opening, with a support structure closing this opening, in particular over its entire surface, for support with respect to a built-up direction transversely to the inlet and/or outlet section. Following additive manufacturing of the body, the support structure, which at least partially closes the opening(s), is to be removed, for example by machining, to form the housing.

In an alternative embodiment, at least the inner surface to be directed to the process fluid, in the region of the inlet channel and/or the outlet channel, preferably with the exception of the inlet opening, the outlet opening, a neck collar opening and/or a bridge opening, is not post-processed by machining.

In an embodiment of the method that can be combined with the previous ones, the inlet opening, the outlet opening, the neck collar opening and/or the bridge opening, is produced by machining post-processing of the additively manufactured body, in particular with a circular cross-section. In this process, at least a part, in particular completely, of a supporting structure of the additively manufactured body can be removed.

In an exemplary embodiment of the manufacturing process, the additively formed body, in particular the housing, preferably fitting or valve housing, is not post-processed by machining.

In one embodiment of the manufacturing process, the body is additively formed in layers from a metal powder, in particular a powdered steel alloy, may include at least one alloy component selected from the group consisting of Cr, Ni, Mo, Nb and Ti.

The angle of overhang can be described with reference to the accompanying FIG. 15, which shows a typical shape of a conventional control valve housing. Here, the built-up direction $A_z$ is parallel to the coaxial center lines m at the inlet and outlet openings of the inlet and outlet channels, respectively. In accordance with the layered structure, the built-up direction $A_z$ is referred to in the following as the vertical direction. A horizontal direction extends transversely to the vertical direction (in the viewing direction).

The neck region h has a substantially hollow cylindrical shape which extends in the horizontal direction orthogonally to this center line. Inside the hollow cylindrical neck region h, a hollow region b having a circular cross section is formed which is surrounded by the inner wall i. The hollow region b may come into contact with a process fluid during operational use of the control valve. In the layer-by-layer additive construction of a housing body g as shown, the lower half u of the neck region h, which is u-shaped in cross section in the vertical direction, is formed first. In this region, the inclination angle $\alpha_a$ of the inner surface i of the body g corresponds to a continuously curved slope. The lower half u and the upper half o of the neck region h with respect to the built-up direction $A_z$ meet at a reversal point s, where the inner wall i of the body extends parallel to the vertical built-up direction $A_z$. In the built-up direction $A_z$ or vertical direction above the reversal point s, the inner wall i of the body tapers in a semicircular shape to circumscribe the circular cavity. At the reversal point, an overhang angle of 0° relative to the built-up direction is realized. Above the reversal point s, the overhang angle $\alpha_b$ increases continuously along the inner wall i. At the upper vertex p of the circular cavity of the nominal geometry according to FIG. 15, the overhang angle reaches 90° relative to the built-up direction $A_z$. The region surrounding the vertex p in which the overhang angle $\alpha_c$ on the inner side of the circular cross-section is above a threshold value within the meaning of the present disclosure is indicated by a dash dot line. For easier reading of the angles, auxiliary lines a in built-up direction $A_z$ are represented by the reversal points s.

A control valve housing according to the disclosure is generally denoted by the reference sign 1. A semi-finished product according to the disclosure for a control valve housing 1 is generally provided with the reference sign 10. According to the disclosure, the control valve housing 1 or the semi-finished product 10 for a control valve housing 1 comprises an additively manufactured body 11 formed in layers. The body 11 comprises an inlet channel 3, an outlet channel 7, a bridge section 5 and a neck region 9, which together delimiting a channel structure 2 for process fluid; the channel structure is described in detail below. In those embodiments shown in the figures, the angular threshold value is, by way of example, about 60°. Within the scope of the disclosure, a different angular threshold value may be provided.

Various embodiments with different built-up directions are described below on the basis of the accompanying figures. In the embodiments shown in FIGS. 1 to 7, the built-up direction $A_x$ corresponds to an actuating direction of the control valve. In the embodiments according to FIGS. 8 to 13, the built-up direction $A_z$ corresponds to the center line of the channel structure 2 at the inlet opening 30 or outlet opening 50. FIG. 14 shows a semi-finished product with inclined built-up direction $A_i$.

As a further feature of the various embodiments according to FIGS. 8 to 12, it is shown here by way of example that a support structure 23, 24 may be provided in the region of the channel structure 2 in the body 11 of the semi-finished product 10, which support structure 23, 24 is removed following additive manufacturing of the body 11 in order to turn the semi-finished product 10 into an actuator housing 1.

FIG. 1 shows an additively manufactured body 11 of a semi-finished product 10 or control valve housing 1, which has an outer surface 14 facing the surroundings. The outer surface 14 has overhang surfaces 41 with respect to the built-up direction here $A_x$, whose angle of inclination $\alpha_a$ is not greater than an angular threshold value of about 60°.

In general, due to the fact that the outer surface 14 of the body 11 is not in operational contact with the process fluid inside the channel structure 2, it is subject to less stringent requirements than the inner surface 12 of the body described below, which is to be brought into operational contact with the process fluid. With regard to the outer surfaces 14, a different, larger angular threshold value can be defined than with regard to the inner surfaces 12. It can be provided or at least tolerated that machining post-processing, for example, is carried out on the outer surface 14 as part of the manufacturing of the control valve housing 1. However, it can be advantageous if no machining post-processing, in particular, is required following the additive manufacturing of the body 11 for the control valve housing 1, in order to minimize the number of production steps required for manufacturing.

An overhang region 42 is arranged on the outer surface or outer side 14 at the lower transition region of the body 11 between the flange 13, which surrounds the inlet opening 30, and the material surrounding the inlet channel 3, in which the outer surface 14, in a small region, has an angle of inclination which exceeds the angular threshold value and, with reference to the built-up direction $A_x$, has an angle of inclination of 90° at the vertex 45. The overhang region 42 on the flange 13 is only a few millimeters wide in the horizontal direction, so that deviations from a nominal geometry are hardly to be expected at this point. Furthermore, the overhang region 42 on the flange 13 is not in contact with the process fluid inside the channel structure 2 during operation, so that post-processing could take place here if, contrary to expectations, deformations occur during the additive manufacturing of the body 11.

On the underside of the body 11 in relation to the built-up direction $A_x$, 14 support ribs 44 are provided on the outside. One support rib 44 extends below the inlet channel 3. Another support rib 44 extends below the outlet channel 7. With the aid of the support rib 44, it can be ensured along the process fluid flow direction that the body 11 is formed on the lower outer side 14 of the channel structure 2 with overhang surfaces 41 whose overhang angle $\alpha_A$ does not exceed the angular threshold value. Such longitudinal support ribs 44 on the outer surface 14 of the body 11 may be advantageous to aid in shape fidelity during additive manufacturing of the body 11. The support ribs 44 generally do not interfere with the functionality of the control valve housing 1, so the support ribs 44 of the semi-finished product 10 may be retained for the finished control valve housing 1. Alternatively, subsequent removing of one or more external support ribs 44 may be performed following additive manufacturing of the body 11, if desired.

The body 11 also has an overhang region 42 with respect to the built-up direction $A_x$ on the underside 46 of the flange 19, which forms the neck collar region 9 and surrounds the neck collar opening 90. A surface may be provided on the underside 46 of the flange 19 having an overhang inclination of about 90° with respect to the built-up direction. On the flange 19, it may be provided that for the formation of, for example, through-holes for mounting screws for connecting a cover, a lantern or the like, the upper side of the flange 19 is subjected to machining processing, wherein shape deviations on the underside 42 of the flange 19 can be tolerated or, if necessary, removed.

FIG. 2 shows a perspective view of the body 11 according to FIG. 1, wherein the drop-shaped inlet opening 30 and the circular neck collar opening 90 are recognizable. Also, the circular bridge opening 50 in the bridge region 5 of the channel structure 2 can be sectionally seen. The circular openings 50 and 90 here exemplarily define a common, coaxial center line $m_9$, which corresponds to the stroke axis of a (not shown in more detail) translationally movable valve member. The built-up direction $A_x$ is determined corresponding to this center line. During additive manufacturing of the body 11 in the built-up direction $A_x$, the circular opening cross sections of the neck collar opening 90 and the bridge opening 50 can be formed. It is conceivable that machining post-processing of the neck collar opening 90 and/or the bridge opening 50 can be omitted for a control valve housing 1 with build-up direction $A_x$ corresponding to the center line $m_9$.

The inlet channel 3 has a drop shape transversely to the built-up direction $A_x$, by means of which it is ensured that the inner overhang surfaces 21 on the inner surface 12 of the body 11 have an angle of inclination $\alpha_i$ which is below the angular threshold value.

FIG. 3 shows a sectional view of the body 11 from below, looking in the built-up direction $A_x$. Overhang surfaces 41 with an overhang angle smaller than the angular threshold value are arranged on both sides of the support rib 44, which extends in a straight line in the direction of flow, on the outer surface 14 of the body 11. The overhang region 42 at the transition between the support rib 44 and the flange 13 extends over only a few millimeters.

FIGS. 4 to 6 show different shapes of the body 11 in the region of the inlet and outlet channels 3, 7, respectively. FIG. 4 shows a sectional view through the outlet channel 7 near the outlet opening 70. FIG. 5 shows a sectional view through the inlet channel 3 near the inlet opening 30. The sectional planes according to FIGS. 4 and 5 through the body 11 correspond to a primary cross-sectional direction in which the overhang angle $\alpha_i$ at the respective overhang surfaces 21 of the inner surface 12 has a minimum which is lower than the angular threshold value. The overhang angle $\alpha_i$ of the inner surface 12 or the overhang angle $\alpha_a$ of the outer surface 14 is drawn with respect to a vertical reference line a extending parallel to the built-up direction $A_x$.

FIG. 4 shows a cross-sectional view through the outlet channel 7 looking towards the outlet opening 70. The flange 17 is provided with 8 through-holes for attachment to a pipe flange, not shown in detail, by means of bolts or the like. The through-holes can be formed as holes through the additively manufactured body 11 of the semi-finished product 10 to form the control valve housing 1. At the lower end of the body 11 in the built-up direction $A_x$, the support rib 44 extends parallel to the main flow direction of the inlet channel 7. The outer side 14 of the body 11 is formed with overhang surfaces 41 having an outer overhang angle $\alpha_a$ not equal to the angular threshold value.

In both the outlet channel 7 shown in FIG. 4 and the inlet channel 3 shown in FIG. 5, the inner side 12 of the body 11 defining the channel structure 2 is semicircular in the lower region of the inlet channel 7.

In the upper region of the inlet channel 3 and the outlet channel 7, respectively, the inner surface 12 has two inner overhang surfaces 21, being mirror-symmetrically opposite each other with respect to the main flow direction. The inner overhang surfaces 21 meet at a vertex 25. They form a vertex tip 29 with a gable arch shaped configuration. The gable shape of the vertex tip 29, which is formed by the overhang surfaces 21, results from the planar, flat shape of the overhang surfaces 21, which can be seen, for example, in FIG. 4. The overhang surfaces 21 form a planar surface which extends in the main flow direction and according to the overhang inclination $\alpha_i$ and merges tangentially into the remaining circular inner surface 12 of the channel structure 2. The internal overhang inclination $\alpha_i$ of the overhang surfaces 21 is constantly less than or equal to the angular threshold value.

The flange 13 can be formed during the additive manufacturing of the body 11, in particular including the through openings. Alternatively, it is conceivable that the flange 19 is manufactured as a separate milled component and is attached to the body 11 of the semi-finished product 10 to form the control valve housing 1 following additive manufacturing, for example by welding.

FIG. 6 shows an external view looking at the flange 17 surrounding the drop-shaped outlet opening 70 as shown in FIG. 4. FIG. 7 shows an alternative embodiment in which the body 11 is formed by additive manufacturing in the same built-up direction $A_x$ as previously described. In order to form a standard circular inlet cross-section, it can be provided that in a manufacturing step following the additive manufacturing the outlet opening 70 is formed circularly, for example by milling or drilling. The region 77 of the outlet opening 70 shown hatched in FIG. 7 can be partially or completely formed in the semi-finished product 10 with a support structure (not shown in more detail), which can be formed, for example, as a rib, web, grid, membrane, wall with wall thickness corresponding to the flange 17, or the like. The outlet channel 7 located upstream of the outlet opening 70 in the direction of flow may be partially, predominantly or completely formed with an inner wall 12 having overhang surfaces 21 with an inner overhang angle smaller than the angular threshold value and which may have, for example, a drop shape. In the region of the outlet channel 7, there can preferably be no support structures in the semi-finished product 10 that require post-processing. The same applies to the opposite inlet opening (not shown).

Another embodiment of a semi-finished product 10 for a control valve housing is shown in FIGS. 8 to 11. FIG. 8 shows a top view of the semi-finished product 10, FIG. 9 a bottom view of the semi-finished product 10. FIGS. 10 and 11 show schematic sectional views of the body 11 through the semi-finished product 10, wherein in FIG. 10 the support structure 24 formed during additive manufacturing of the semi-finished product 10 is present in the neck section 9 and bridge section 5 and has been removed in the embodiment of a control valve housing 1 based on the semi-finished product 10 shown in FIG. 11. The primary cross-sectional plane, with respect to the overhanging support structure surface corresponds here substantially to the cross-sectional view shown in FIG. 10, in relation to which the overhang angle of the support structure has its minimum with respect to the built-up direction $A_x$. With respect to the neck and bridge region, the primary cross-sectional plane is substantially that shown in FIGS. 8 and 9.

In the body 11 in FIGS. 8 to 11, the center line $m_3$ at the inlet opening 30 of the inlet channel 3 is aligned coaxially with the center line $m_7$ at the outlet opening 70 of the outlet channel 7. The built-up direction $A_z$ is set parallel to the center line $m_3/m_7$. The cross-section of the inlet channel 3 as well as of the outlet channel 7 with respect to the operational main flow direction of process fluid through the control valve housing 1 is adjustable in its shape, for example circular, elliptical, or defined on the basis of sections of the inner surfaces 12 as three-dimensionally curved free-form surfaces. In the inlet channel 3 and in the outlet channel 7, the inner surface 12 with respect to an overhang angle is formed sectionally by a ramp-like overhang inclination which guides to the bridge section 5 and which has an overhang angle $\alpha_i$ below the angular threshold value, as exemplarily shown in FIG. 10 for the inner surface 12 in the region of the inlet channel 3 with respect to the center point line $m_3$ of the inlet opening 30.

In the region of the bridge section 5 and the neck section 9, the body 11 of the semi-finished product 10 has a support structure in the form of a support rib 24. With respect to the built-up direction $A_z$, the support rib 24 has an overhang angle which is not greater than the angular threshold value. With respect to the support structure, the same overhang angle may be defined as with respect to the inner surface 12 in general. Alternatively, in the case of a support structure such as that illustrated herein in FIGS. 8 to 10, which is removed to produce the finished actuator housing 1, it may be preferred that a smaller angular threshold value is determined with respect to the inner surfaces 12 than with respect to the support structure surface 26. For example, an angular threshold value with respect to the support structure surface 26, corresponding to the aforementioned angular threshold value with respect to the outer surface 14, could be greater than the angular threshold value with respect to the inner surface 12.

As shown in FIGS. 8 to 10, the support rib 24 is attached to the bridge section 5 of the body 11 on its underside with respect to the built-up direction $A_z$. The support rib 24 extends in a wedge shape in the built-up direction $A_z$ until the vertex 25 of the bridge opening 50 and neck collar opening 90 to be formed. The support rib 24 extends at its upper end in in the neck and bridge section 5, 9 parallel to the direction of the center line $m_9$ of the neck region continuously from the neck collar opening 90 to the bridge opening 50. The support rib 24 supports the vertex (25)-region of the neck and bridge section 5, 9.

In the region of the vertex 25 of the channel structure 2 of the control valve housing 1 to be formed, the support rib 24 is used to ensure that the overhang surfaces 21 on the inner surface 12 on the one hand and laterally of the support rib 24 on the other hand have an overhang angle that is smaller than the angular threshold value. Only in a very narrow region not more than 10 mm wide laterally of the support structure 24 an overhang region 22 is formed in which the angular threshold value is exceeded. Due to its small dimensions, this narrow overhang region does not pose a significant risk of inaccurate manufacturing; moreover, the overhang region is removed together with the support structure to form the finished actuator housing 1, so that any manufacturing inaccuracies disappear. A residual region of the support rib (24) may remain in the neck region 9 of the body 11 of the control valve housing 1 to serve as a flow divider.

FIG. 9 shows the underside of the body 11. In the built-up direction $A_z$, a rib 44 extends along the outer surface 14 from the lowermost flange section 13, which surrounds the inlet opening 30, to a base section 40. Below the base section 40, the outer surface 14 has different overhang surfaces 41, which have an overhang angle with respect to the built-up direction $A_z$ in the primary cross-sectional plane shown, which is not greater than the angular threshold value. In the region of the opposite uppermost flange section 17, an overhang region 42 may be provided on the outer surface 14, as well as in the region of the neck collar flange section 19. With respect to these outer overhang regions 42, the same applies as described above with respect to the previous embodiment.

The semi-finished product 10 according to FIG. 12 corresponds essentially to that described above with respect to FIGS. 8 to 11, with the exception of the support structure 23, so that reference is generally made to the foregoing. FIG. 12 shows an alternative embodiment of a body 11 having the same built-up direction $A_z$ as in FIGS. 8 to 11. The body 11 forms a semi-finished product 10 in which a first support web 23 is formed in the region of the bridge opening 50. The body 11 comprises a second support web 23 in the region of the neck collar opening 90. In the neck region 9 between the neck collar opening 90 and the bridge opening 50, the inner surface 12 of the body 11 is formed by an overhang surface 21 having an overhang inclination $\alpha_i$ with respect to the built-up direction $A_z$ corresponding to the center line $m_3/m_7$ through the inlet and outlet openings 30, 70, which angular threshold value does not exceed.

Lateral to the support webs 23, a respective region of the inner surface 12 of the body 11 is formed in the region of the opening 50 or 90 as an overhang surface 21 with an overhang inclination $\alpha_i$ below the angular threshold value. In order to form a control valve housing 1 from the semi-finished product 10 according to FIG. 12, for example a control valve housing 1 as shown in FIG. 13, the supporting struts 23 are removed in the region of the neck collar opening 90 and the bridge opening 50, for example by milling and/or drilling.

FIG. 13 shows a control valve housing 1 which can be formed, for example, on the basis of the semi-finished product 10 shown in FIG. 12.

With regard to the main flow direction described above and the terms inlet opening, outlet opening, etc., it should be made clear that the terms selected here are purely exemplary and are chosen to simplify readability. With regard to the basic structure of a semi-finished product 10 for a control valve housing 1, the practical main direction of flow may be chosen, according to operation, alternatively in the opposite direction to that previously described. Instead of the term inlet opening, the term first opening could also be selected and instead of the term inlet channel, the term first channel could be referred to. The same applies with respect to the outlet opening and the outlet channel, which could accordingly be referred to as second opening or second channel. A control valve housing formed according to the above disclosure may be used for a control valve that is operationally equipped with an actuator that closes in the flow direction (so-called FTC valve or flow-to-close valve), or that opens in the flow direction (so-called FTO valve or flow-to-open valve).

The features disclosed in the foregoing description, figures and claims may be significant both individually and in any combination for the realization of the disclosure in the various embodiments. In particular, the skilled person understands that instead of a control valve described above by way of example, another valve or fitting can be realized accordingly.

REFERENCE SIGNS

1 Housing
2 Channel structure
3 Inlet channel
5 Bridge section
7 Outlet channel
9 Neck region
10 Semi-finished product
11 Body
12 Inner surface
14 Outer surface
17 Flange
19 Flange
21 Overhang surface
23 Support webs
24 Support rib 25 Vertex
26 Support structure surface
30 Inlet opening
41 Overhang surface
42 Overhang region
44 Support rib
45 Vertex
50 Bridge opening
70 Outlet opening
77 Region
90 Neck collar opening
a vertical reference line
$m_3, m_7, m_9$ Center line
$A_x, A_z, A_i$ Built-up direction
$\alpha_i$ Overhang angle (inside)
$\alpha_a$ Overhang angle (outside)

The invention claimed is:

1. A method for additively manufacturing a housing for a valve, comprising:
defining a build-up direction;
forming, successively in layers and in the build-up direction, a body of the housing, the body including an inlet channel, an outlet channel, a bridge section, and a neck region configured to delimit a channel structure to be formed for process fluid, the body being delimited by an inner surface to be directed towards the process fluid and by an outer surface to be facing a surroundings,
wherein the inner surface and/or the outer surface is formed with at least one overhang surface with respect to the build-up direction, the at least one overhang surface defining an overhang angle with respect to the build-up direction, and
wherein: (a) the overhang angle, or (b) angles, with respect to the build-up direction, of the inner surface and/or outer surface, is less than or equal to an angular threshold value with respect to the build-up direction, the angular threshold value being determined: (a) based on at least one further process parameter, and/or (b) to be at most 70° and/or at least 20°.

2. The method according to claim 1, wherein the build-up direction is defined parallel to:
a center line of an inlet channel and/or outlet channel; or
a center line of the neck region.

3. The method according to claim 1, wherein a plurality of inner overhang surfaces of the inner surface are formed with an overhang angle smaller than or equal to the angular threshold value.

4. The method according to claim 1, wherein a plurality of outer overhang surfaces of the outer surface are formed with an overhang angle smaller than or equal to the angular threshold value.

5. The method according to claim 1, further comprising placing at least one flange section as a separate component on the additively manufactured body.

6. The method according to claim 1, wherein the body surrounding the channel structure of the valve is formed in a region of a vertex of the channel structure with respect to the built-up direction by two mutually opposite inner overhang surfaces, by which a vertex tip, is formed.

7. The method according to claim 1, wherein the body is formed in the region of the bridge section and/or the neck region with at least one support structure for supporting a vertex of the channel structure of the valve, the vertex being related to the built-up direction, the at least one support structure being formed with an overhang inclination at a support structure surface of not more than the angular threshold value.

8. The method according to claim 1, wherein the body is formed with a support structure closing the opening:
in a region of a circular opening of the housing for support with respect to the built-up direction, or
at an inlet opening and/or an outlet opening with respect to the built-up direction, transversely to an inlet and/or outlet section.

9. The method according to claim 1, wherein at least the inner surface to be directed towards the process fluid, in a region of the inlet channel and/or an outlet channel, with exception of the inlet opening, the outlet opening, a neck collar opening and/or a bridge opening, is formed without post-processing by machining.

10. The method according to claim 1, wherein the inlet opening, the outlet opening, the neck collar opening, and/or the bridge opening, is produced with a circular cross-section by machining post-processing the additively manufactured body.

11. The method according to claim 1, wherein the valve is produced with a flow divider formed at least sectionally from a support structure, which has been at least sectionally removed.

12. The method according to claim 1, wherein the additively manufactured body is not post-processed by machining.

13. The method according to claim 1, wherein the body is additively formed in layers from a metal powder comprising at least one alloy component selected from the group consisting of Cr, Ni, Mo, Nb and Ti.

14. A method for additively manufacturing a housing for a valve, comprising:
defining a build-up direction;
forming, successively in layers and in the build-up direction, a body of the housing, the body including an inlet channel, an outlet channel, a bridge section, and a neck region configured to delimit a channel structure to be formed for process fluid, the body being delimited by an inner surface to be directed towards the process fluid and by an outer surface to be facing a surroundings,
wherein the inner surface and/or the outer surface is formed with at least one overhang surface with respect to the build-up direction, the at least one overhang surface defining an overhang angle with respect to the build-up direction,
wherein: (a) the overhang angle, or (b) angles, with respect to the build-up direction, of the inner surface and/or outer surface, is less than or equal to an angular threshold value with respect to the build-up direction, and
wherein at least the inner surface to be directed towards the process fluid, in a region of the inlet channel and/or an outlet channel, with exception of the inlet opening, the outlet opening, a neck collar opening and/or a bridge opening, is formed without post-processing by machining.

15. A method for additively manufacturing a housing for a valve, comprising:
defining a build-up direction;
forming, successively in layers and in the build-up direction, a body of the housing, the body including an inlet channel, an outlet channel, a bridge section, and a neck region configured to delimit a channel structure to be formed for process fluid, the body being delimited by an inner surface to be directed towards the process fluid and by an outer surface to be facing a surroundings,
wherein the inner surface and/or the outer surface is formed with at least one overhang surface with respect to the build-up direction, the at least one overhang surface defining an overhang angle with respect to the build-up direction, wherein: (a) the overhang angle, or (b) angles, with respect to the build-up direction, of the inner surface and/or outer surface, is less than or equal to an angular threshold value with respect to the build-up direction, and wherein the inlet opening, the outlet opening, the neck collar opening, and/or the bridge opening, is produced with a circular cross-section by machining post-processing the additively manufactured body.

\* \* \* \* \*